United States Patent [19]
Angelo

[11] Patent Number: 5,887,131
[45] Date of Patent: Mar. 23, 1999

[54] METHOD FOR CONTROLLING ACCESS TO A COMPUTER SYSTEM BY UTILIZING AN EXTERNAL DEVICE CONTAINING A HASH VALUE REPRESENTATION OF A USER PASSWORD

[75] Inventor: Michael F. Angelo, Houston, Tex.

[73] Assignee: Compaq Computer Corporation, Houston, Tex.

[21] Appl. No.: 777,621

[22] Filed: Dec. 31, 1996

[51] Int. Cl.[6] .................................................. G06F 11/00
[52] U.S. Cl. ............................ 395/188.01; 395/183.12; 395/750.06
[58] Field of Search ............................ 395/188.01, 186, 395/187.01, 750.02, 750.05, 750.06, 183.12; 380/3, 4, 23, 25; 340/825.3, 825.34; 705/18, 44, 405

[56] References Cited

U.S. PATENT DOCUMENTS

| | | | |
|---|---|---|---|
| 4,405,829 | 9/1983 | Rivest et al. | 178/22.1 |
| 4,604,708 | 8/1986 | Lewis | 395/188.01 |
| 4,757,534 | 7/1988 | Matyas et al. | 380/25 |
| 4,799,258 | 1/1989 | Davies | 380/21 |
| 4,890,323 | 12/1989 | Beker et al. | 380/25 |
| 5,204,966 | 4/1993 | Wittenberg et al. | 395/188.01 |
| 5,210,795 | 5/1993 | Lipner et al. | 380/23 |
| 5,276,737 | 1/1994 | Micali | 380/30 |
| 5,315,658 | 5/1994 | Micali | 380/30 |
| 5,375,243 | 12/1994 | Parzych et al. | 395/188.01 |
| 5,448,045 | 9/1995 | Clark | 235/382 |
| 5,511,122 | 4/1996 | Atkinson | 380/25 |
| 5,537,540 | 7/1996 | Miller et al. | 395/183.14 |
| 5,555,373 | 9/1996 | Dayan et al. | 395/188.01 |
| 5,590,199 | 12/1996 | Krajewski et al. | 380/25 |
| 5,619,066 | 4/1997 | Curry et al. | 257/679 |
| 5,623,637 | 4/1997 | Jones et al. | 395/188.01 |
| 5,649,118 | 7/1997 | Carlisle et al. | 395/241 |
| 5,655,124 | 8/1997 | Lin | 395/750.04 |
| 5,666,415 | 9/1997 | Kaufman | 380/23 |
| 5,694,471 | 12/1997 | Chen et al. | 380/25 |
| 5,699,514 | 12/1997 | Durinovic-Johri et al. | 395/188.01 |
| 5,704,040 | 12/1997 | Gunji | 395/188.01 |
| B1 4,604,708 | 10/1997 | Lewis | 395/188.01 |

OTHER PUBLICATIONS

Applied Cryptography, Second Edition, pp. 29–31; 429–459, 1996.
Electronic Design, Products Newsletter, p. 167, Nov. 1996.
Dallas Semiconductor, 64Kbit Touch Memory, DS1996, 1995.
Dallas Semiconductor, Touch Memory Starter Kit, DS9092K, 1995.
Dallas Semiconductor, Touch COM Port Adapter, DS9097/DS9097E, 1995.
Dallas Semiconductor, Touch MultiKey, DS1991, 1995.

*Primary Examiner*—Joseph E. Palys
*Attorney, Agent, or Firm*—Pravel, Hewitt & Kimball

[57] ABSTRACT

A method for permitting access to secured computer resources based upon a two-piece user verification process. In the disclosed embodiment, the user verification process is carried out during a secure power-up procedure. At some point during the secure power-up procedure, the computer user is required to provide an external token or smart card to the computer system. The token or smart card is used to store an authentication value(s) required to enable secured resources. The computer user is then required to enter a plain text user password. Separate passwords can be used to enable various portions of the computer system. Once entered, a one-way hash function is performed on the user password. The resulting hash value is compared to an authentication value (token value) downloaded from the token. If the two values match, the power-on sequence is completed and access to the computer system and/or secured computer resources is permitted. If the two values do not match, power to the entire computer system and/or secured computer resources are disabled. The two-piece nature of the authorization process requires the presence of both the user password and the external token in order to access protected computer resources.

20 Claims, 5 Drawing Sheets

METHOD FOR CONTROLLING ACCESS TO A COMPUTER SYSTEM BY UTILIZING AN EXTERNAL DEVICE CONTAINING A HASH VALUE REPRESENTATION OF A USER PASSWORD

BACKGROUND OF THE INVENTION

1. Field of the Invention

The invention relates to security in a computer system, and more particularly to permitting access to secured computer resources based upon comparison of a hash value representation of a plain text user password and a hash value stored in an external token.

2. Description of the Related Art

Today's businesses invest large amounts of money in hardware and software, and even more money is spent developing information contained in data files such as text documents and spreadsheets. Protecting such investments can be critical to the success and reputation of a business. Public accounts of the exploits of computer "hackers"—as malicious code-breakers or eavesdroppers are sometimes called—have therefore focused and magnified corporate desires for secure communications and better methods of protecting data. The scope of the problem is undoubtedly even more serious than reported, given the reluctance of many businesses to report security breaches. As a result, security conscious users are requesting that security and integrity features be incorporated into their computers to restrict access to data contained on hard drives, as well as information contained in other critical system components.

One known approach to security involves encryption or cryptography. Cryptography is typically used to protect both data and communications. Generally, the original message or data item is referred to as "plain text", while "encryption" denotes the process of disguising or altering a message in such a way that its substance is not readily discernable. An encrypted message is called "ciphertext". Ciphertext is returned to plain text by an inverse operation referred to as "decryption". Encryption is typically accomplished through the use of a cryptographic algorithm, which is essentially a mathematical function. The most common cryptographic algorithms are key-based, where special knowledge of variable information called a "key" is required to decrypt ciphertext. There are many types of key-based cryptographic algorithms, providing varying levels of security.

The two most prevalent cryptographic algorithms are generally referred to as "symmetric" (also called secret key or single key algorithms) and "public key" (also called asymmetric algorithms). The security in these algorithms is centered around the keys—not the details of the algorithm itself. This makes it possible to publish the algorithm for public scrutiny and then mass produce it for incorporation into security products.

One problem with key-based algorithms is speed. Public key algorithms, in particular, are typically on the order of 1,000 times slower than symmetric algorithms. Even symmetric algorithms can be slow when compared with so-called "one-way functions" (also known as "one-way hash functions").

Briefly, a typical one-way hash function, denoted H(M), operates on an arbitrary-length block of text or message M. The one-way hash function returns a fixed-length hash value, h, such that h=H(M), were h is of length m. One-way hash functions have special characteristics that make them one-way. Given M, for example, it is easy to compute h. Given h, it is hard reverse the hashing process and compute M such that H(M)=h. Further, it is very difficult to find another message, M', such that H(M)=H(M'). In essence, the one-way hash function provides a "fingerprint" of M that is unique, and is therefore frequently used for purposes of authenticating the source of a message.

While much attention has been given to protecting and authenticating communications and data as they are transmitted via internal networks (intranets) and external networks (such as the Internet), fewer security improvements have focused on protecting the hardware itself. One known method of offering limited access to hardware and the data it contains is by the use of passwords. A password is typically stored in battery-backed CMOS RAM memory. Before the user is allowed access to the computer or secured computer resources, the user is required to enter a password. Once a password is entered, the computer's power-on routine compares the password to the password in CMOS memory and, if they match, the user is allowed access.

A main disadvantage of this system is that certain forms of attack can bypass the CMOS memory because in many cases it is not read protected. To address this concern, the password can be encoded. Many encoding schemes can be reverse engineered by a sophisticated computer virus or malicious code, however, potentially leading to a costly security breach. Further, the CMOS memory could simply be disconnected from its battery, causing the loss of the password and any other contents.

Physical keys or tokens, such as those used to unlock a door, have also been used to permit access to a computer system. Like the password approach, this type of security is "one-piece" in nature, and is compromised if the key or token is stolen. Anyone possessing the key can gain access to the computer's data and is accorded the same level of access as the authorized user.

Providing sufficient security can be particularly difficult for portable computers. Unlike their desktop counterparts, portable computers are easily stolen. Once stolen, the security afforded by physical keys or passwords used to protect data stored on a hard drive or other mass storage devices is readily bypassed. For example, it is a simple procedure to physically remove the hard drive unit from the stolen computer—which is password protected—and install it in a second computer system. Because the surrogate computer system may not employ password protection or the password may be known, the hard drive unit or other mass storage device becomes readily accessible to an unauthorized user and its data is vulnerable to theft and misuse.

To prevent unauthorized access of this type, the data may be encrypted before it is placed on the hard drive, rendering the data meaningless until it is decoded. Encryption, however, reduces the computer system's performance due to the delay associated with the encryption process. To confront this problem, hard drives and other storage devices have been created which prevent data access operations on the hard drive upon power-up until the user enters a password. The password is located on the disk itself to prevent bypassing the hard drive security by installation in a new computer system. This type of security, while generally effective, is again one-piece in nature and is only as secure as the password itself. Currently, there exists no satisfactory method of protecting vulnerable or stolen computer equipment and the data it might contain from unauthorized access.

SUMMARY OF THE INVENTION

Briefly, a computer system according to the present invention utilizes a two-piece authentication procedure to enable access to secured computer resources. In the disclosed embodiment of the invention, the password verification process is carried out during a secure power-up procedure. At some point during the secure power-up procedure, the computer system checks for the presence of an external token or smart card that is coupled to the computer through specialized hardware. The token or smart card is used to store at least one authorization value needed to enable power to the computer system or access to secured resources.

Following detection of the external token, the computer user is required to enter a plain text user password. Separate passwords can be used to enable different portions of the computer system. Once entered, a one-way hash function is performed on the user password. The resulting hash value is compared to an authentication value (token value) downloaded from the token. If the two values match, the power-on sequence is completed and access to the computer system and/or secured computer resources is permitted. If the two values do not match, power to the entire computer system and/or secured computer resources are disabled.

By using a one-way hash function stored in the host computer system to perform hashing of a user-entered password, and then comparing the resulting value to a value stored in an external token, the user password value does not need to be stored in the host computer. Further, the two-piece nature of the user verification process is advantageous due to the fact that if either the user password or the external token is stolen, it is of little value. Both pieces are required to access protected resources.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and applications are hereby incorporated by reference:

Commonly-assigned U.S. Pat. No. 5,537,540, entitled "TRANSPARENT, SECURE COMPUTER VIRUS DETECTION METHOD AND APPARATUS", referred to as the "SAFESTART patent";

Commonly-assigned U.S. patent application Ser. No. 08/779,061, entitled, "SECURITY CONTROL FOR A PERSONAL COMPUTER," filed on Mar. 3, 1995;

Commonly-assigned U.S. Pat. No. 5,375,243, entitled "HARD DISK PASSWORD SECURITY SYSTEM";

Commonly-assigned U.S. patent application Ser. No. 08/632,892, entitled "SECURE POWER SUPPLY," filed on Apr. 16, 1996, now U.S. Pat. No. 5,751,950; and Commonly-assigned U.S. patent application Ser. No. 08/657,982, entitled "METHOD AND APPARATUS FOR PROVIDING SECURE AND PRIVATE KEYBOARD COMMUNICATIONS IN COMPUTER SYSTEMS", filed on May 29, 1996, now U.S. Pat. No. 5,748,888.

Figure 1:
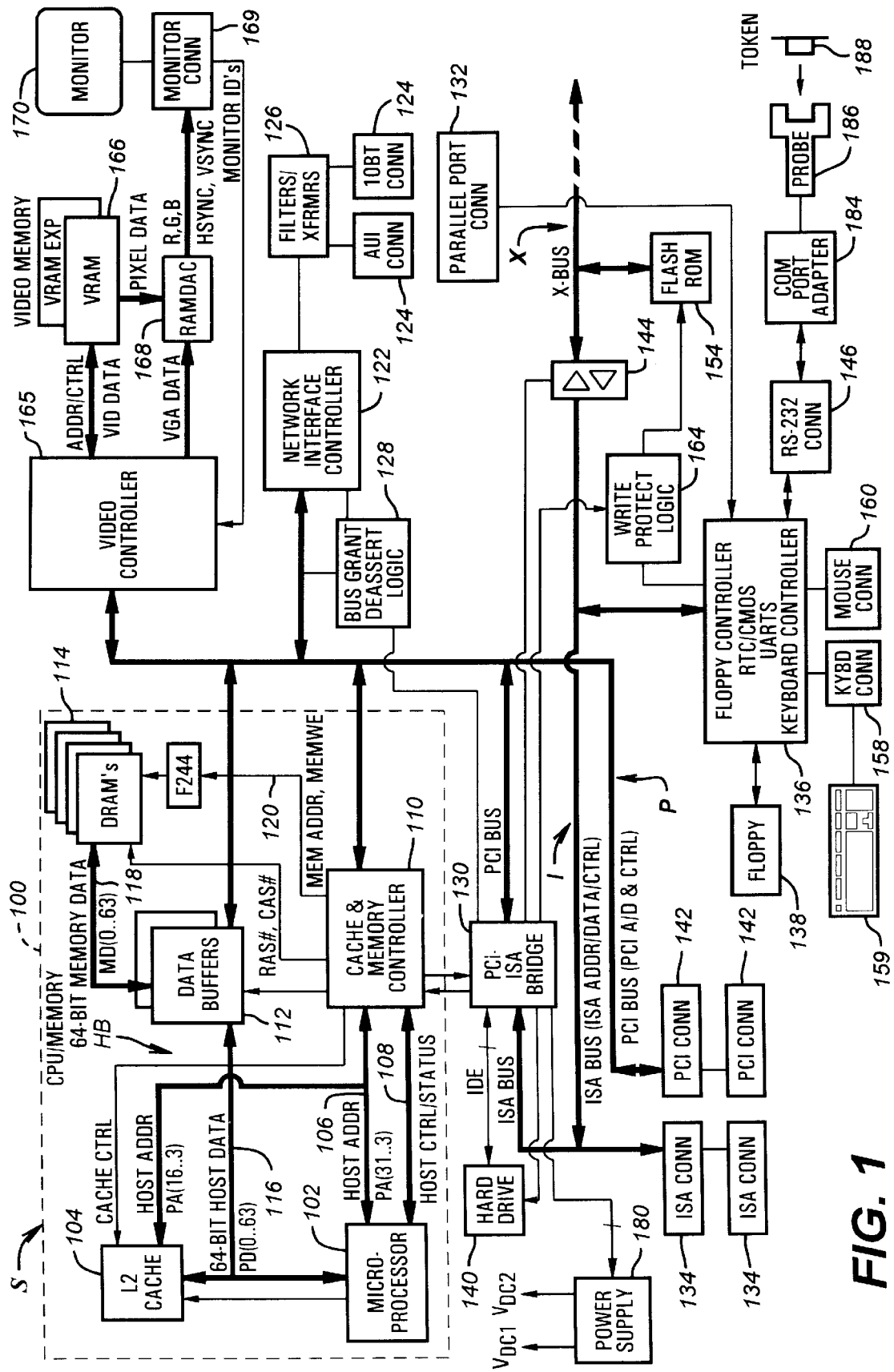
FIG. 1 is a schematic block diagram of a computer system incorporating capabilities according to the present invention for securely comparing a hash value generated from a user password to an authentication value stored in an external token.

Referring first to FIG. 1, a computer system S according to the present invention is shown. In the preferred embodiment, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar or next-generation processors. The processor 102 drives data, address, and control portions 116, 106, and 108 of a host bus HB. A level 2 (L2) or external cache memory 104 is connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and are coupled to and drive the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) can be similarly connected.

In the disclosed embodiment, the PCI-ISA bridge 130 also includes miscellaneous system logic. This miscellaneous system logic contains counters and activity timers as conventionally present in personal computer systems, an interrupt controller 111 (FIG. 3) for both the PCI and ISA buses P and I, and power management logic. Additionally, the miscellaneous system logic may include circuitry for a security management system used for password verification and to allow access to protected resources as described more fully below.

The PCI-ISA bridge 130 also includes circuitry to generate a "soft" (System Management Interrupt), as well as SMI and keyboard controller interface circuitry. The miscellaneous system logic is connected to the flash ROM 154 through write protection logic 164. As discussed below, separate enable/interrupt signals are also communicated from the PCI-ISA bridge 130 to the power supply 180 and the hard drive 140. Preferably, the PCI-ISA bridge 130 is a single integrated circuit, but other combinations are considered within the scope of the invention.

A series of ISA slots 134 are connected to the ISA bus I to receive ISA adapter cards. A series of PCI slots 142 are similarly provided on the PCI bus P to receive PCI adapter cards. These types of expansion slots are well known to those skilled in the art.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

A network interface controller (NIC) 122 is also connected to the PCI bus P. Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a local area network (LAN).

A combination I/O chip 136 is connected to the ISA bus I. The combination I/O chip 136 preferably includes a real time clock, two UARTS, a floppy disk controller for controlling a floppy disk drive 138, and various address decode logic and security logic to control access to an internal or external CMOS/NVRAM memory (not shown) and stored password values. Further details of contemplated uses of the NVRAM memory are provided below. Additionally, a control line is provided to the read and write protection logic 164 to further control access to the flash ROM 154. Serial port connectors 146 and parallel port connector 132 are also connected to the combination I/O chip 136.

An 8042, or keyboard controller, is also included in the combination I/O chip 136. The keyboard controller is of conventional design and is connected in turn to a keyboard connector 158 and a mouse or pointing device connector 160. A keyboard 159 is connected to the computer system S through the keyboard connector 158.

A buffer 144 is connected to the ISA bus I to provide an additional X-bus X for various additional components of the computer system S. A flash ROM 154 receives its control, address and data signals from the X-bus X. Preferably, the flash ROM 154 contains the BIOS information for the computer system and can be reprogrammed to allow for revisions of the BIOS.

Figure 3:
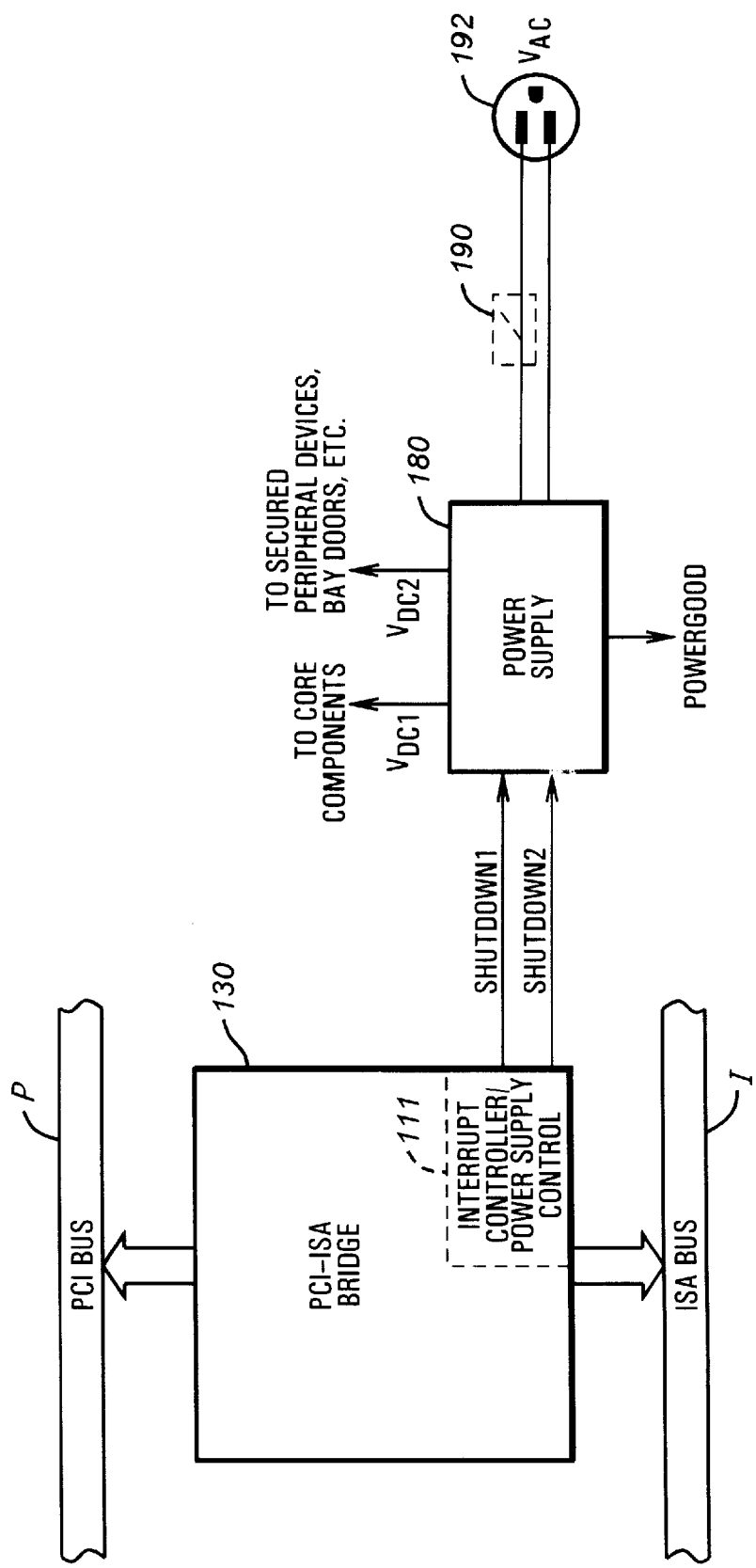
FIG. 3 is a schematic diagram of an exemplary power supply constructed to receive shutdown signals from a computer system according to the present invention.

In the computer system S of FIG. 1, all electronic devices discussed above, including the processor 102, are powered by a regulated power supply 180. In the preferred embodiment, the regulated power supply has a power supply supervisory circuit that provides shutdown capability via power supply control signals SHUTDOWN1 and SHUTDOWN2 (FIG. 3). The power supply 180 receives an AC voltage supply via an AC plug 192 (FIG. 3).

In the disclosed embodiment, the computer system S contains circuitry for communicating with a removable security token 188. The precise physical nature of the token 188 is not considered critical to the invention. The token can take many forms, such as a Touch Memory™ device supplied by Dallas Semiconductor, Inc., a smart card, or an encryption card. Preferably, the token 188 is easily decoupled from the computer system S and easily transportable by the token bearer. As discussed in more detail below, the token 188 contains one or more hash value representations of user-entered password(s). A hash value derived from a plain text user password is typically required to match an authentication value stored in the token 188 before access to a specified secured computer resource is permitted. Ideally, the token 188 is capable of communicating digitally with the computer system S during momentary contact with or proximity to the computer system S. The token 188 of the disclosed embodiment is also capable of storing the authentication value(s) in a non-volatile manner and can be permanently write-protected to discourage tampering.

In the disclosed embodiment of the invention, the circuitry used for establishing a communication link between the token 188 and the computer system S consists of a probe 186 connected to a COM or serial port adapter 184. The port adapter 184 is connected to the RS232 connector 146. Alternatively, the port adaptor 184 could interface with an application specific integrated circuit (ASIC). In operation, the token 188 is detachably received by the probe 186. The probe 186 includes circuitry for reading and writing memory in the token 188, and can be fully powered through the RS232 connector 146. In addition, the probe 186 includes presence detector circuitry for ascertaining the presence of a token 188.

An additional feature of the computer system S is a System Management Mode (SMM), which is generally known to those skilled in the art. It is also noted that FIG. 1 presents an exemplary embodiment of the computer system S and it is understood that numerous other effective embodiments could readily be developed as known to those skilled in the art.

Figure 2A:
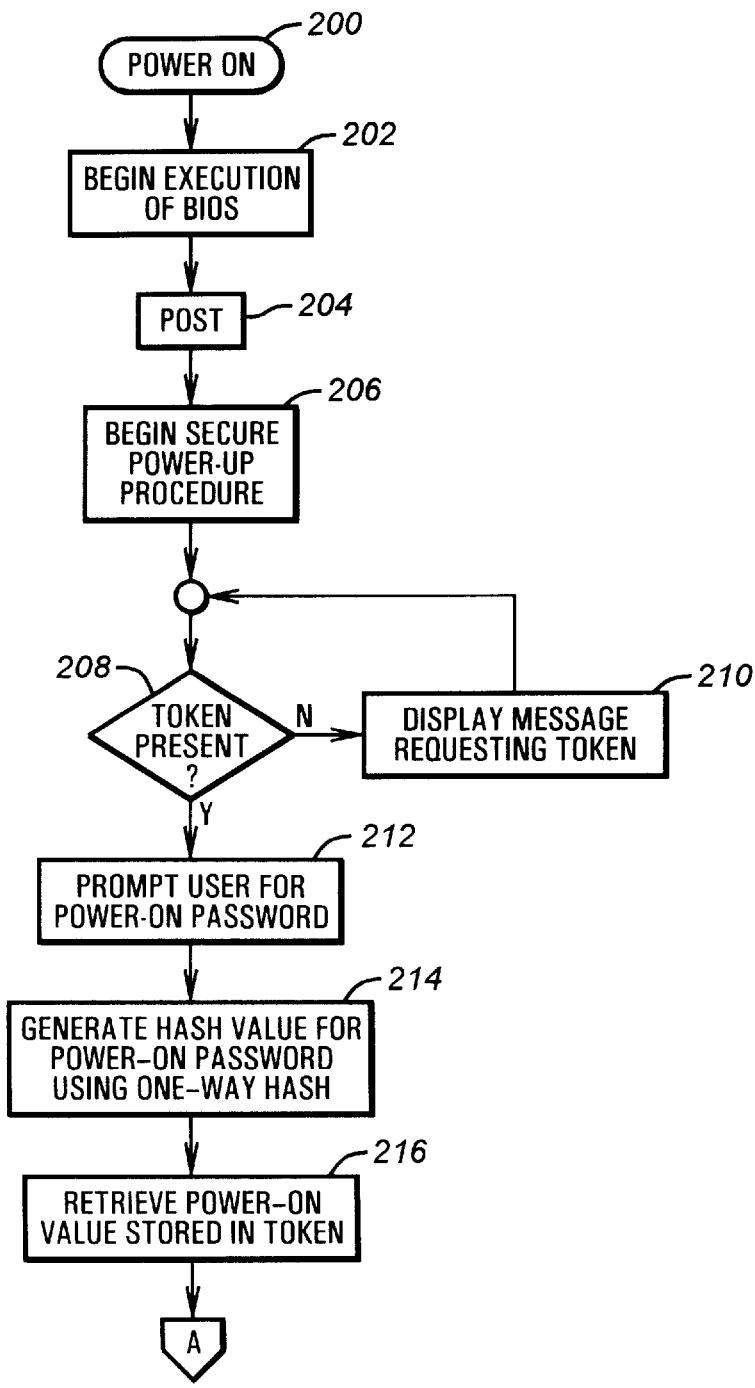
FIGS. 2A–2C are flowchart diagrams illustrating a secure power-on sequence according to the present invention for verifying user identity and enabling peripheral devices.
Figure 2B:
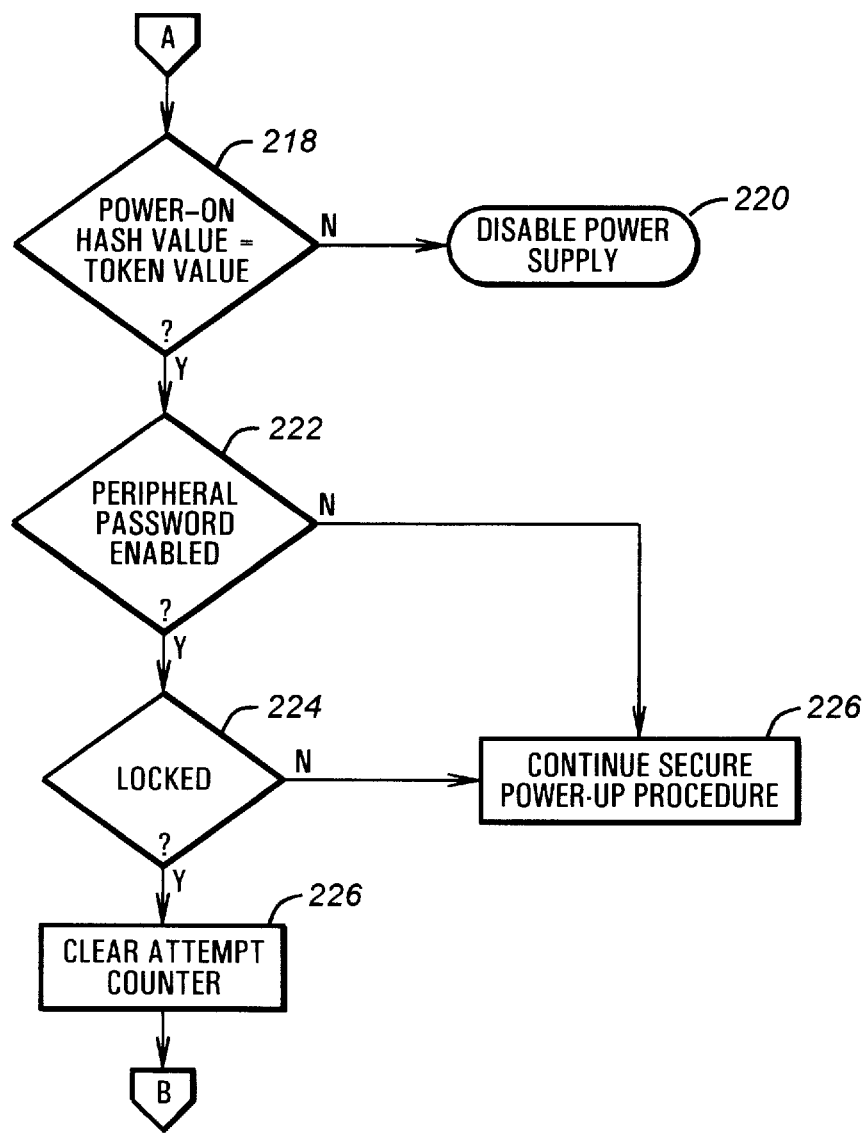
Figure 2C:
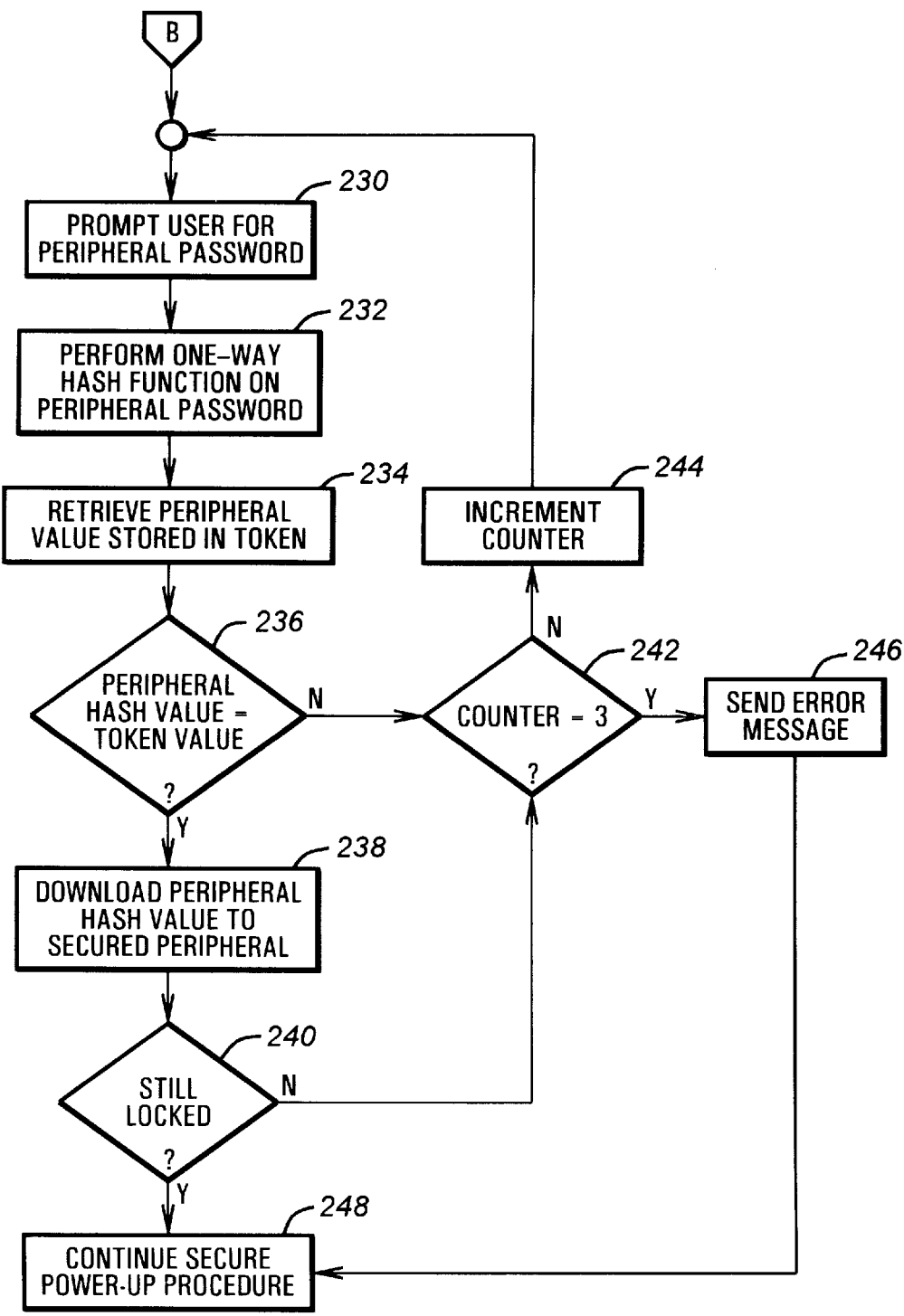

Referring now to FIGS. 2A–2C, an exemplary power-on sequence incorporating two-piece user verification according to the invention is shown. The sequence builds upon a secure power-up procedure, such as that described in the SAFESTART patent. Briefly, the SAFESTART procedure reduces the administrative requirements of earlier security measures. A reserved non-DOS hard disk partition is used to pre-boot the computer system and provide a secure environment from which to verify files. Upon power-up or reset, the computer performs the power-on self test (POST), during which it checks a SAFESTART track by comparing its hash value to a value stored in NVRAM. If the integrity of the SAFESTART track is verified, the first "SAFESTART" routine is loaded into memory and executed.

The SAFESTART routine first checks the master boot record and boot sectors of the hard disk. This verification captures a large majority of viruses and is performed before any code residing in those areas is executed, thus preventing the spread of any discovered viruses. Further checks are performed on SAFESTART files before each is executed. Eventually, system files and any additional designated user files are verified. Since the computer system was booted from an atypical partition, the drives are remapped to account for the shift in logical disk drive addressing. When the verification process is completed, SAFESTART files are cleaned up, a latch is set to prevent unauthorized modification of the initial hash values, and control is returned to the BIOS to boot the user operating system. Thus, a computer system implemented according to the SAFESTART patent insures that designated software and passwords are trustworthy following a power-up cycle.

As shown in FIG. 2A, when power to the computer system S is initially applied or the system undergoes a cold restart, the POWER-ON sequence 200 is commenced. In the first step 202 of the POWER-ON sequence 200 the computer system S begins executing from BIOS ROM. The BIOS is preferably stored in flash ROM 154 and contains low level programming for booting the operating system, and an interrupt handler for accessing the hard drive 140. Control then proceeds to step 204 where the computer system S performs a power-on self test (POST) to determine if all system hardware is operating properly.

Following additional power-on steps (optional), control next proceeds to step 206 for commencement of a secure power-up procedure such as that described in the SAFESTART patent. In the disclosed embodiment, operating sequences for the secure power-up procedure are configured as an option ROM and located in the option ROM address space in a conventional manner. Preferably, the operating sequences are provided as the last option ROM in order to allow any other option ROM's to be installed at the outset. The system BIOS executes this portion of the secure power-on sequence as a part of its scan for option ROMs, which are executed when encountered in POST. This arrangement requires address decoding for the power-on sequence, but also simplifies distribution into a family of computer systems. Alternatively, the power-on sequence could be implemented as a direct call from the BIOS, rather than an option ROM call.

Control next proceeds to step 208 to determine if a token 188 is present. If the aforementioned presence detection circuitry determines that a token is not present, control loops to step 210 to display a message requesting that the user provide a token 188. When a token 188 is present as determined in step 208, control passes to step 212 where the user is prompted to enter a plain text power-on password. As an alternative to a memorized value, the plain text password could be generated with the aid of biometrics. For example, a scanned fingerprint could be converted into a plain text password value. Further, the precise ordering of steps 208–212 is not considered critical to the invention.

Control next proceeds to step 214 and a one-way hash function is performed on the plain text password entered by the user to create a "power-on hash value". Examples of different one-way hash functions that are suitable for use in the invention include: Snefru, N-Hash, MD4, MD5, M2, and the Secure Hash Algorithm (SHA). Most of these algorithms and the respective strengths and weaknesses of each are well known to those skilled in the art. As used in this disclosure, the term "secure hash value" or "hash value" refers generally to a value—generated by an integrity assessment code or a one-way hash function—that is specific to a given password. Of importance to the invention is that each password have a corresponding and effectively distinct hash value.

Differentiating valid passwords from invalid passwords is one application to which one-way hash functions are particularly well suited, due in part to speed of operation. One-way hash functions can be orders of magnitude faster than many of the popular encryption algorithms. Another advantage of one-way hash functions is uniformity of length between resulting hash values. One-way hash functions are typically constructed such that a password of any length produces a hash value of a predetermined length. In the disclosed embodiment of the invention, the one-way hash function produces a hash value that is at least 160 bits in length. A hash value of this length reduces the effectiveness of brute-force attacks against the one-way hash function.

Following generation of the power-on hash value, control proceeds to step 216 and an authentication value (hereinafter "power-on token value") is retrieved from token 188 via the RS232 connector 146 or an alternate connection port. Control then proceeds to step 218 of FIG. 2B and the power-on hash value is compared to the power-on token value. Alternatively, the power-on hash value could be communicated to the token 188 (in step 216) for comparison to the stored value. In this embodiment of the invention, the token 188 is required to have computational capabilities, as well as the capability to communicate the results of the comparison to the computer system S.

If the encrypted password and the stored value are not equal as determined in step 218, control proceeds to step 220 and the power supply 180 is disabled. The resulting delay associated with re-booting the computer system S discourages brute force attacks against the user password in situations in which the external token has been misappropriated.

Several other options are available at this point. In one contemplated embodiment of the invention, the core components needed to boot the computer system S are powered by one supply voltage ($V_{DC1}$), while other secured components are powered by a second supply voltage ($V_{DC2}$). A bifurcated power supply 180 according to this embodiment of the invention is discussed in greater detail in conjunction with FIG. 3. Devices powered by the second supply signal might include bay door/case locks and mass storage devices. Under this arrangement, the second power supply signal is initially disabled, but is turned on following detection of a valid power-on hash value. The power-on hash value used for this operation can be the same value generated in step 214, or a separate hash value that is generated at a later point (even outside of the secure power-up procedure). By requiring entry of a valid power-on password before enabling power to peripheral devices or unlocking bay door/case locks, the possessor of a stolen computer will usually be forced to physically damage the computer casing before gaining access to secured resources. The value of stolen computer equipment is thereby reduced, and computer theft is discouraged.

As shown in FIGS. 2B and 2C, the secure power-up procedure can also include steps that provide password security for specified peripheral devices or other secured computer resources. In the disclosed embodiment of the invention, an exemplary procedure for gaining access to a single secured peripheral device begins at step 222 following detection of a valid system password in step 218. In step 222, a specified peripheral device is polled to determine if it is password enabled.

One device that could be secured in accordance with the invention is a disk drive such as that described in the previously incorporated patent entitled "HARD DISK PASSWORD SECURITY SYSTEM." In a conforming disk drive, unauthorized access is prevented by placing an access password value on the disk drive itself When the computer system is powered up, the disk drive unit is in a LOCKED state and demands that the password value be downloaded before access is allowed. No access to the disk drive—other than to wipe all of the data from the drive or to check the drive's status—is permitted until the password value stored on the disk drive is received. If the user attempts to gain access to the disk drive by removing the drive from the original computer and placing it in another system, the disk drive remains inaccessible. Because the password value is located on a secure portion of the disk drive instead of in the system CMOS, the disk will remain LOCKED regardless of the computer system in which it is operating. Circuitry is also included for preventing an unauthorized user from bypassing the security system by simply swapping the firmware controlling the disk drive.

If a disk drive or other secured peripheral is password enabled as determined in step 222, control passes to step 224 and the peripheral is examined to determine if it is locked. Preferably, the peripheral is locked each time power to the computer system S is cycled. If the specified peripheral device is not locked (i.e., the peripheral password is the same as the power-on hash value generated in step 214), or if the peripheral device is not password enabled, control proceeds to step 226 and any remaining steps in the secure power-up procedure are completed.

If the peripheral device is locked, a two-piece user authentication process is performed. Control first proceeds to 228 and an optional attempt counter is cleared. Control then passes to step 230 (FIG. 2C) and the computer user is prompted to enter a plain text peripheral password. Next, in step 232, a one-way hash function is performed on the plain text peripheral password, creating a "peripheral" hash value.

In the disclosed embodiment of the invention, control next passes to step 234 where another authentication value (hereinafter "peripheral token value") is retrieved from token 188 via the RS232 connector 146 or an alternate connection port. Control then proceeds to step 236 where the peripheral hash value and the peripheral token value are compared. If the two values match, control passes to step 238 and the peripheral hash value is downloaded to the secured peripheral for comparison to a value stored in the peripheral device's memory. Alternatively, an enable signal could be provided directly to the secured peripheral at step 238. In either case, the peripheral device remains in a locked state if the peripheral hash value does not match the value stored in the peripheral device's memory. By storing the valid encrypted password value in the peripheral device's local memory, the peripheral device can be moved to another computer system S and yet require the same peripheral password, one-way hash function, and token 188 for access.

After the peripheral hash value is downloaded to the peripheral device, the peripheral device is polled in step 240 to determine if it is still locked. If it is not locked, control passes to step 248 and the secure power-up procedure is completed. If the peripheral device is still locked, or the peripheral hash value and the peripheral token value do not match as determined in step 236, control instead passes to step 242 to determine if the maximum number of allowed attempts (shown as 3) at generating the correct peripheral password has been reached. If not, the attempt counter is incremented in step 244 and control then returns to step 230 where the user is prompted to enter a new plain text password. If the maximum number of attempts is reached, control proceeds to step 246 for display of an optional error message. Control then passes to step 248 and the secure power-up procedure is completed.

It is also contemplated that the two-piece user authentication process could be accomplished outside of a secure power-up procedure. In this embodiment of the invention, peripherals are unlocked during normal system operation. Access to secured computer resources is again controlled by the comparison of a peripheral password hash value and an authentication value stored in the token 188. The comparison and hashing operation occurs in the secured computer resource or in secure memory such as that disclosed in the previously incorporated "SECURITY CONTROL FOR A PERSONAL COMPUTER" which describes a security device (hereinafter referred to as the "black box" security device).

Briefly, the black box security device controls access to various secured resources of the computer system, such as the flash ROM 154 or any designated hardware devices. After a password hash value has been downloaded to the black box security device, a command to protect secured resources is issued to the security device. The command prevents unauthorized access to any of the secured resources. To access a secured resource, the user must thereafter provide the correct authentication value to the black box security device. The security device can only verify—but does not divulge—the authentication value, thereby enhancing system security. A multitude of hash values or other information can be protected with the black box security device.

If a plain text password is entered for hashing during normal computer operation, access to the black box security device can be provided by a secure keyboard communications channel that utilizes the system management mode (SMM) of the processor 102. One such mechanism is described in previously incorporated "METHOD AND APPARATUS FOR PROVIDING SECURE AND PRIVATE KEYBOARD COMMUNICATIONS IN COMPUTER SYSTEMS." In this invention, a request for secure keyboard communications causes the computer's processor to enter into SMM. The SMI handler then directs specialized hardware to intercept and divert keyboard interrupts, such that data entered via the keyboard is only communicated to the aforementioned non-readable black box security device. The secured keyboard communications channel prevents critical data entered through a keyboard from being intercepted by malicious software code, such as a virus masquerading as a screen saver or device driver. Keystrokes are not visible to any other processes, and the black box security device can be configured such that it is only written in this manner.

By utilizing the secure keyboard link, the plain text passwords required to access different features or memory spaces of a secured resource can be entered in a secure fashion without the time delays associated with the secure power-on procedure. The two-piece authentication process can also be configured for use with Plug and Play devices.

It should be observed that in each of the embodiments of the invention described above, the user authentication or password verification process is two-piece in nature. Neither the password nor the hash value need be stored in the computer system under this two-piece authentication scheme. If either the user password or the external token is misappropriated, it is of little value. Both pieces are required before secured computer resources can be accessed. In addition, the scope of the invention not considered to be limited to the disclosed secure power-up procedure. Likewise, the precise ordering of the power-up steps is not considered critical to the invention.

Referring now to FIG. 3, a schematic diagram of a power supply 180 according to the invention is shown. The power supply 180 is capable of being disabled by the computer system. As mentioned above, the PCI-ISA bridge 130 contains an interrupt controller/power supply control circuit 111. The interrupt controller/power supply control circuit 111 provides a pair of power supply control signals SHUTDOWN1 and SHUTDOWN2 to the power supply 180. The power supply 180 is connected to an AC voltage source $V_{AC}$ through an AC plug 192. A power supply status signal POWERGOOD is also provided as is conventional in computer system power supplies.

In the disclosed embodiment, the power supply 180 is capable of providing a pair of supply voltages $V_{DC1}$ and $V_{DC2}$. Enablement of the power supply voltages $V_{DC1}$ and $V_{DC2}$ is controlled by the power supply control signals SHUTDOWN1 and SHUTDOWN2, respectively. These power supply control signals SHUTDOWN1 and SHUT- DOWN2 are asserted or deasserted as necessary to enable/disable the supply voltages $V_{DC1}$, and $V_{DC2}$.

When the computer system S is initially powered up, the supply voltage $V_{DC1}$ provides power to the core system components required to boot the computer system S. As discussed in conjunction with FIGS. 2A and 2B, failure to successfully complete the verification process causes $V_{DC1}$, to be disabled. The supply voltage $V_{DC2}$ can be provided to secure system resources such as mass data storage devices or bay door/case lock activation circuitry. Again, provision of this supply voltage to the secured resources is predicated upon successful completion of the two-piece user authentication process.

The precise manner in which the power supply control signals SHUTDOWN1 and SHUTDOWN2 are generated is not considered critical to the invention, and a number of computer system components S could be utilized. By way of example, the power supply control signals could be generated by interrupt techniques similar to those disclosed in the previously incorporated "SECURE POWER SUPPLY." In addition, it is contemplated that the supply voltages $V_{DC1}$ and $V_{DC2}$ could be enabled or disabled external to a secure power-up routine.

Certain of today's computers incorporate various "health meters" used to disable the computer when necessary to prevent damage to system components. In such systems, the computer can be configured to turn itself off if temperature exceeds a specified level (as may happen if a cooling fan fails) or other potentially harmful conditions are detected. In yet another contemplated embodiment of the present invention, the power supply 180 is disabled by generating false signals indicative of such a condition.

In power supplies 180 which do not incorporate control signal inputs, one of the power supply control signals SHUTDOWN1 or SHUTDOWN2 can be used as an actuation signal to cause a switch 190 to break the connection between the power supply 180 and the AC plug 192 in the event of an unsuccessful user verification process. In this embodiment, a first end of the AC plug 192 is connected to one end of the switch 190, while a second end of the plug 192 is connected to a second AC input of the power supply 180. A second end of the switch 190 is connected to the first AC input of the power supply 180. When closed, the switch 190 provides an electrical connection for the AC voltage from the AC plug 192 to the power supply 180.

Thus, a method has been described for permitting access to secured computer resources based upon a two-piece user verification process. At some point during a secure power-up procedure, the computer user is required to provide an external token or smart card to the computer system. The computer user is then required to enter a plain text user password. Separate passwords can be used to enable various portions of the computer system. Once entered, a one-way hash function is performed on the user password. The resulting hash value is compared to a value downloaded from the token. If the two values match, the power-on sequence is completed and access to the computer system and/or secured computer resources is permitted. The two-piece nature of the user verification process is advantageous due to the fact that if either the user password or the external token is stolen, it is of little value. Both pieces are required to access protected resources.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for permitting access to secured resources in a computer system incorporating circuitry for communicating with an external token that includes an authentication value, the computer system further incorporating a secure power-up procedure or other secure operating mode, the method comprising the steps of:

providing a plain text user password to the computer system while the computer system is in a secure period of operation, the secure period of operation being independent of the external token;

performing a one-way hash function on the plain text user password to produce a hash value;

communicatively coupling the external token to the computer system;

comparing the hash value with the authentication value stored in the external token, the comparison occurring in the computer system; and enabling access to a secured internal computer resource in response to the result of said step of comparing the hash value with the authentication value stored in the external token.

2. The method of claim 1, wherein the secure period of operation includes a secure power-up procedure.

3. The method of claim 1, wherein said step of comparing the hash value with the authentication value stored in the external token occurs in secure computer memory.

4. The method of claim 1, wherein said step of comparing the hash value with the authentication value stored in the external token occurs in the secured computer resource.

5. The method of claim 1, wherein said step of performing a one-way hash function on the plain text user password to produce a hash value occurs in secure computer memory.

6. The method of claim 1, wherein the external token is a smart card.

7. The method of claim 1, wherein the external token is a Touch Memory™ device.

8. The method of claim 1, wherein the one-way hash function is SHA.

9. A method for enabling or disabling power in a computer system incorporating circuitry for communicating with an external token that includes an authentication value, the computer system further incorporating a secure power-on process or other secure operating mode and a power supply providing at least one power supply voltage to computer system components, the method comprising the steps of:

providing a plain text user password to the computer system while the computer system is in a secure period of operation, the secure period of operation being independent of the external token;

performing a one-way hash function on the plain text user password to produce a hash value;

communicatively coupling the external token to the computer system;

comparing the hash value with the authentication value stored in the external token; and enabling or disabling at least one power supply voltage in response to the result of said step of comparing the hash value with the authentication value stored in the external token.

10. The method of claim 9, wherein said step of enabling or disabling at least one supply voltage comprises disabling all power supply voltages in the computer system if the hash value is not equal to the authentication value stored in the external token.

11. The method of claim 9, wherein the external token is a smart card.

12. The method of claim 9, wherein the external token is a Touch Memory™ device.

13. A computer system having security capabilities that operate in conjunction with an external token containing an authentication value, the computer system further having system memory and a secure power-on process or other secure operating mode, comprising:

a system bus;

a processor coupled to said system bus;

communication circuitry coupled to said processor for communicating with the external token;

a secured internal computer resource coupled to said processor;

security code stored in a processor readable medium for causing the processor to perform the steps of:

receiving a plain text user password while the computer system is in the secure operating mode, the secure operating mode being independent of the external token;

performing a one-way hash function on the plain text user password to produce a hash value;

receiving the authentication value from the external token;

comparing, in the computer system, the hash value with the authentication value stored in the external token; and enabling or disabling said secured computer resource in response to the result of said step of comparing the hash value with the authentication value stored in the external token.

14. The computer system of claim 13, wherein said secure operating mode is a secure power-on procedure.

15. The computer system of claim 13, wherein said communication circuitry is configured to communicate with a smart card.

16. The computer system of claim 13, wherein said communication circuitry is configured to communicate with a Touch Memory™ device.

17. The computer system of claim 13, wherein said secured computer resource is a disk drive.

18. A computer system having security capabilities that operate in conjunction with an external token containing an authentication value, the computer system further having system memory and a secure power-on process or other secure operating mode, comprising:

a system bus;

a processor coupled to said system bus;

communication circuitry coupled to said processor for communicating with the external token;

a power supply providing at least one power supply voltage to computer system components;

power-on code stored in a processor readable medium for causing the processor to perform the steps of:

receiving a plain text user password while the computer system is in the secure operating mode, the secure operating mode being independent of the external token;

performing a one-way hash function on the plain text user password to produce a hash value;

receiving the authentication value from the external token;

comparing, in the computer system, the hash value with the authentication value stored in the external token; and enabling or disabling at least one power supply voltage from said power supply in response to the result of said step of comparing the hash value with the authentication value stored in the external token.

19. The computer system of claim 18, wherein said step of enabling or disabling at least one supply voltage comprises causing the processor to disable all power supply voltages in the computer system if the hash value is not equal to the authentication value stored in the token.

20. The computer system of claim 18, wherein said step of enabling or disabling at least one supply voltage comprises causing the processor to enable a power supply voltage to a portion of the computer system if the hash value is equal to the authentication value stored in the token.

* * * * *